(12) United States Patent
Schafer

(10) Patent No.: US 10,849,722 B2
(45) Date of Patent: Dec. 1, 2020

(54) COMPUTER-ASSISTED MANUFACTURING METHOD FOR A TOOTH REPLACEMENT PART OR A DENTAL AUXILIARY ELEMENT

(71) Applicant: SIRONA DENTAL SYSTEMS GMBH, Bensheim (DE)

(72) Inventor: Andreas Schafer, Rimbach (DE)

(73) Assignee: DENTSPLY SIRONA INC., York, PA (US)

( * ) Notice: Subject to any disclaimer, the term of this patent is extended or adjusted under 35 U.S.C. 154(b) by 0 days.

(21) Appl. No.: 16/300,992

(22) PCT Filed: May 19, 2017

(86) PCT No.: PCT/EP2017/062062
§ 371 (c)(1),
(2) Date: Nov. 13, 2018

(87) PCT Pub. No.: WO2017/198803
PCT Pub. Date: Nov. 23, 2017

(65) Prior Publication Data
US 2019/0159875 A1 May 30, 2019

(30) Foreign Application Priority Data
May 20, 2016 (DE) .................. 10 2016 208 794

(51) Int. Cl.
*A61C 13/00* (2006.01)
*G06F 30/00* (2020.01)
*A61C 1/08* (2006.01)

(52) U.S. Cl.
CPC .......... *A61C 13/0004* (2013.01); *G06F 30/00* (2020.01); *A61C 1/082* (2013.01); *A61C 13/0006* (2013.01); *G05B 2219/45167* (2013.01)

(58) Field of Classification Search
CPC . A61C 13/0004; A61C 13/0006; A61C 1/082; G05B 2219/45167; G06F 30/00
See application file for complete search history.

(56) References Cited

U.S. PATENT DOCUMENTS

| | | | |
|---|---|---|---|
| 5,440,496 A | * 8/1995 | Andersson | A61C 13/0004 700/163 |
| 7,403,830 B2 | 7/2008 | Weber | |

(Continued)

FOREIGN PATENT DOCUMENTS

DE   102009011442 A1   9/2010

OTHER PUBLICATIONS

International Preliminary Report on Patentability Chapter I; PCT/EP2017/062062; dated Nov. 20, 2018.

(Continued)

*Primary Examiner* — Chad G Erdman
(74) *Attorney, Agent, or Firm* — Dentsply Sirona Inc.

(57) ABSTRACT

The invention relates to a method for the computer-assisted manufacturing of a dental replacement part or a dental auxiliary element from a blank, which can be rotated about an axis of rotation, by means of a machining tool, wherein a blank data set comprising the axis of rotation and a model data set of the dental replacement part or dental auxiliary element are stored and the model data set has a first region having a first insertion axis and a second region having a second insertion axis askew to the first insertion axis, wherein in a first positioning step (S1) the model data set is arranged in the blank data set in such a way that the first insertion axis of the model data set is oriented perpendicular to the axis of rotation of the blank data set and in a second positioning step (S2) the second insertion axis of the model (Continued)

data set is oriented perpendicular to the axis of rotation of the blank data set by rotating the model data set about the first insertion axis.

4 Claims, 2 Drawing Sheets

(56) References Cited

U.S. PATENT DOCUMENTS

| | | |
|---|---|---|
| 8,721,237 B2 | 5/2014 | Basler |
| 9,378,308 B2 | 6/2016 | Pieper |
| 2006/0008774 A1 | 1/2006 | Orth |
| 2012/0087757 A1* | 4/2012 | Basler ................ A61C 13/0022 409/132 |

OTHER PUBLICATIONS

International Search Report; PCT/EP2017/062062; Jul. 27, 2017 (completed); dated Aug. 8, 2017.
Written Opinion of the International Searching Authority; PCT/EP2017/062062; Jul. 27, 2017 (completed); dated Aug. 8, 2017.

* cited by examiner

US 10,849,722 B2

COMPUTER-ASSISTED MANUFACTURING METHOD FOR A TOOTH REPLACEMENT PART OR A DENTAL AUXILIARY ELEMENT

TECHNICAL FIELD

The invention relates to methods for the computer-assisted manufacturing of a dental replacement part or a dental auxiliary element by means of a machining tool.

BACKGROUND OF THE INVENTION

Dental replacement parts or dental auxiliary elements, such as, for example, drilling templates or aligners, are usually machined from a blank body by means of a tool of a machine tool. For this purpose the blank is clamped in the machine tool and machined, for example, in accordance with a stored model data record of the part to be manufactured.

If the dental replacement part or the dental auxiliary element to be manufactured comprises a multi-membered structure, for example, a multi-membered bridge with intermediate members, wherein the individual members comprise various axes of insertion or drilling axes that are tilted with respect to one another, then the dental replacement part or the dental auxiliary element can be manufactured by means of a machine tool exhibiting five axes or five degrees of freedom without having to re-clamp the blank during the machining operation. When a machine tool with only four degrees of freedom is used, it is generally not possible to manufacture recesses, which are aligned with one another in a skewed manner, in the context of a single machining operation. The component to be manufactured is then assembled, for example, from a plurality of individually manufactured components; or it is possible to interrupt the manufacturing process and to re-align the blank in the machine tool or, more specifically, the blank holder of the machine tool.

The object of the present invention is to further develop the known manufacturing methods and to provide a manufacturing method that enables a particularly simple and rapid manufacturing of multi-membered components with insertion or drilling axes, which are tilted relative to one another, even with a machining tool having only four degrees of freedom.

SUMMARY OF THE INVENTION

The object of the present invention is a method for the computer-assisted manufacturing of a dental replacement part or a dental auxiliary element by means of a machining tool. The dental replacement part or the dental auxiliary element is machined from a blank by means of a tool of the machine tool, wherein for this purpose the blank is clamped in the machining tool in such a way that said blank can rotate about an axis of rotation that extends perpendicular to a feed axis of the tool.

A three-dimensional blank data record, corresponding to the blank and comprising the axis of rotation, and a three-dimensional model data record of the dental replacement part, which is to be manufactured, or the dental auxiliary element to be manufactured are stored. The model data record comprises a first area with a first axis of insertion and a second area with a second axis of insertion, with the first axis of insertion and the second axis of insertion being aligned with one another in a skewed manner.

The model data record is arranged in the blank data record in at least two positioning steps. In the first positioning step the first axis of insertion of the model data record is aligned perpendicular to the axis of rotation of the blank data record. In the second positioning step following the first positioning step, the second axis of insertion of the model data record is aligned perpendicular to the axis of rotation of the blank data record by rotating the model data record about the first axis of insertion. A result of the arrangement is provided as a position data record of the machining tool, whereby the machining tool machines the dental replacement part or the dental auxiliary element from the blank in accordance with the position data record.

The portion of a dental replacement part that faces the tooth gum, i.e., is in contact with the preparation surface, comprises recesses, which are also referred to as lumens. A multi-membered dental replacement part typically comprises a plurality of differently aligned recesses, with each recess determining a respective direction of insertion of the subarea. Correspondingly, a known axis of insertion indicates the direction along which a recess can be made without undercut.

A dental aid is, for example, a drilling template or an aligner.

A drilling template is used to specify the direction of a bore hole for setting an implant, for which purpose the drilling template comprises a correspondingly aligned through-channel. A multi-membered drilling template comprises a plurality of through-channels, which can extend so as to be skewed with respect to one another. The drilling direction, which is predetermined by the through-channel and which is also referred to as a drilling axis, i.e. the longitudinal axis of the through-channel, is also referred to here as the axis of insertion.

As a result of the two axes of insertion, which are skewed with respect to one another, being aligned such that each of them is perpendicular to the axis of rotation of the blank or the blank holder of the machining tool, it is achieved that both axes of insertion or drilling axes simultaneously extend parallel to the feed axis of the tool. In this way four degrees of freedom are sufficient for an undercut-free manufacturing of the recesses of the dental replacement part, or through-channels of the drilling template, that follow the two insertion axes.

Advantageously in a third positioning step following the second positioning step, the model data record is displaced relative to the blank data record within the blank data record and/or is rotated about the axis of rotation so far that the model data record is arranged completely within the blank data record. The model data record can be shifted or rotated, as desired, within the blank data record after the alignment of the axes of insertion relative to the axis of rotation, as long as the alignment of the axes of insertion relative to the axis of rotation is not changed. Correspondingly it goes without saying that the blank data record could also be shifted or rotated, when the model data record is in a fixed position. By means of, for example, a parallel or vertical displacement or a rotation about the axis of rotation, it can, thus, be ensured that the dental replacement part or the dental auxiliary element can be completely machined from the blank.

Advantageously, after the third positioning step, it is checked as to whether the model data record protrudes from the blank data record and, when the model data record protrudes, an error message is generated, in order to avoid faulty manufacturing processes.

Advantageously, it is ensured for each positioning step that the model data record is arranged completely within the blank data record. A check of the position of the model data record, i.e., as to whether the model data record lies completely within the blank data record, can also be carried out after each individual positioning step.

BRIEF DESCRIPTION OF THE DRAWINGS

Exemplary embodiments of the invention are shown in the drawings. The drawings show in FIG. 1 a model data record of a multi-membered dental replacement part with axes of insertion that are skewed with respect to one another, FIG. 2 a blank data record, FIG. 3 a schematic representation of the process steps.

DETAILED DESCRIPTION OF THE INVENTION

Figure 1:
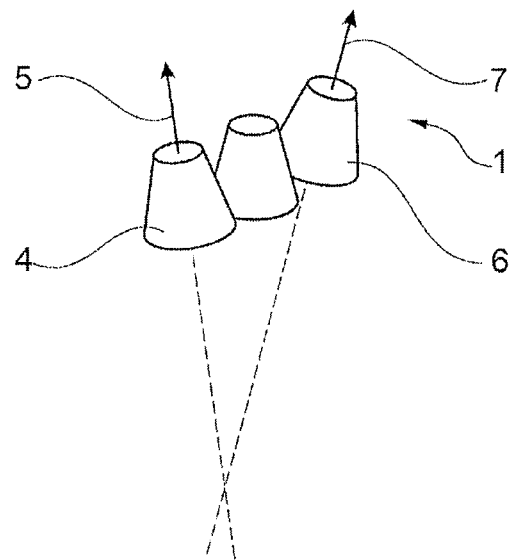

FIG. 1 shows in schematic form a model data record 1 of a dental replacement part that is to be manufactured. The model data record 1 comprises a first area 4 with a first axis of insertion 5 and a second area 6 with a second axis of insertion 7, wherein this case the first axis of insertion 5 and the second axis of insertion 7 extend so as to be skewed with respect to one another.

The model data record 1 could also correspond to an aligner that is to be manufactured. A model data record 1 of a drilling template (not shown) to be manufactured would comprise a first passage opening, extending along the first axis of insertion 5, and a second passage opening, extending along the second axis of insertion 7.

The following explanations regarding the dental replacement part also apply correspondingly to a dental auxiliary element such as, for example, an aligner or a drilling template.

Figure 2:
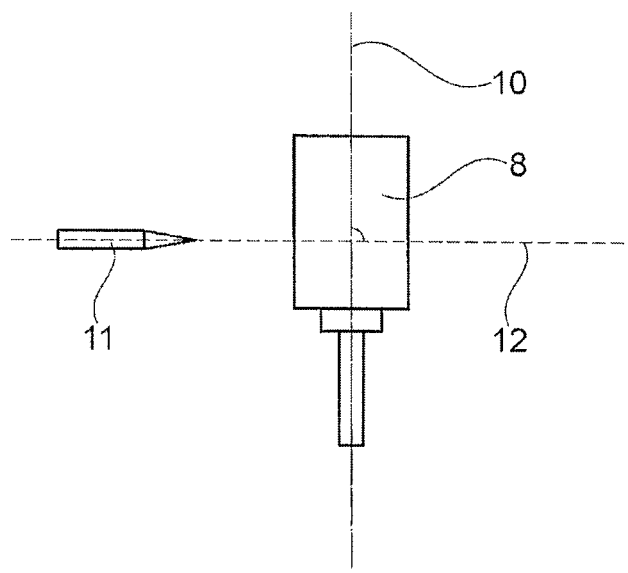

FIG. 2 shows a blank data record 8 of a blank that is to be used for the manufacturing of the dental replacement part or the dental aid; and said blank data record comprises an axis of rotation 10. In order to illustrate the arrangement of the blank in the machine tool (not shown), a tool 11 is shown with a feed axis 12, extending perpendicular to the axis of rotation 10, next to the blank data record 8.

Figure 3:
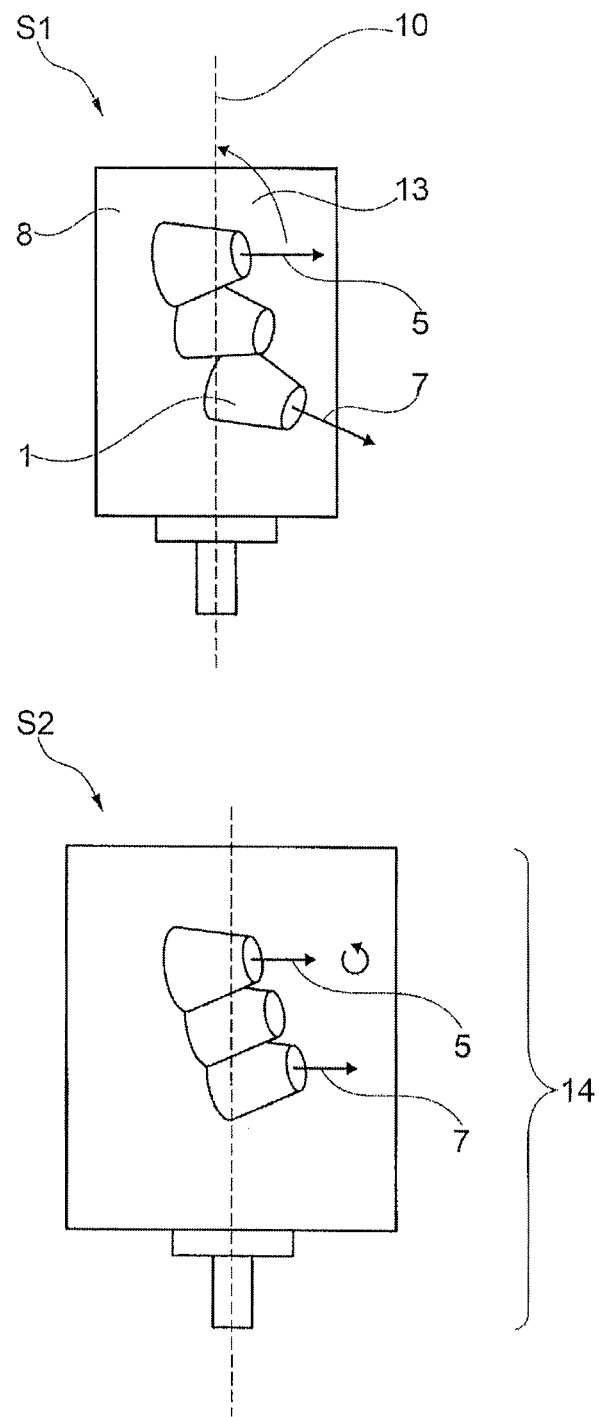

FIG. 3 shows the two positioning steps in schematic form. In the first positioning step the model data record 1 is arranged within the blank data record 8 in such a way that the first axis of insertion 5 is aligned at a right angle 13 to the axis of rotation 10.

In the second positioning step the model data record 1 is rotated so far about the first axis of insertion 5 that the second axis of insertion 7 is also aligned perpendicular to the axis of rotation 10.

The result of the two positioning steps is provided as a position data record 14 for the manufacturing of the dental replacement part or the dental auxiliary element from the blank.

The invention claimed is:

1. A method for the computer-assisted manufacturing of a dental replacement part or a dental auxiliary element by means of a machining tool, the method comprising the steps of:
    machining the dental replacement part or the auxiliary element from a blank by means of at least one tool of the machining tool,
    clamping the blank in the machining tool in such a way that said blank is rotatable about an axis of rotation, which extends perpendicular to a feed axis of the at least one tool,
    storing a three-dimensional blank data record, corresponding to the blank and comprising the axis of rotation,
    storing a three-dimensional model data record of the dental replacement part to be manufactured or the dental auxiliary element to be manufactured, wherein the three-dimensional model data record comprises a first area with a first axis of insertion and a second area with a second axis of insertion,
    aligning the first axis of insertion and the second axis of insertion with respect to one another in a skewed manner,
    arranging the three-dimensional model data record in the three-dimensional blank data record in at least two positioning steps (S1, S2); and a result is provided as a position data record of the machining tool,
    wherein the machining tool of the tooth replacement part or the dental auxiliary element is machined from the blank in accordance with the position data record,
    wherein the first positioning step (S1), the first axis of insertion of the model data record is aligned perpendicular to the axis of rotation of the blank data record,
    wherein the second positioning step (S2) following the first positioning step (S1), the second axis of insertion of the model data record is aligned perpendicular to the axis of rotation of the blank data record by rotating the model data record about the first axis of insertion.

2. The method according to claim 1, further comprising a third positioning step (S3) following the second positioning step (S2), wherein the three-dimensional model data record is shifted relative to the the axis of rotation within the dimensional blank data record and/or is rotated about the axis of rotation so far that the three-dimensional model data record is completely arranged within the three-dimensional blank data record.

3. The method according to claim 2, wherein after the third positioning step (S3), the method further comprises the step of checking whether the three-dimensional model data record protrudes from the three-dimensional blank data record; and, if the three-dimensional model data record protrudes from the three-dimensional blank data record, an error message is generated.

4. The method according to claim 1, wherein for each positioning step (S1, S2) the model data record is arranged completely within the blank data record.

* * * * *